United States Patent
Zeng et al.

(10) Patent No.: US 10,048,435 B2
(45) Date of Patent: Aug. 14, 2018

(54) MOLD-FRAME-FREE LIQUID CRYSTAL DISPLAY DEVICE AND ASSEMBLY METHOD THEREOF

(71) Applicant: Wuhan China Star Optoelectronics Technology Co., Ltd., Wuhan (CN)

(72) Inventors: Jie Zeng, Wuhan (CN); Gege Zhou, Wuhan (CN); Qian Chen, Wuhan (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 171 days.

(21) Appl. No.: 15/111,823

(22) PCT Filed: May 23, 2016

(86) PCT No.: PCT/CN2016/083068
§ 371 (c)(1),
(2) Date: Jul. 15, 2016

(87) PCT Pub. No.: WO2017/190380
PCT Pub. Date: Nov. 9, 2017

(65) Prior Publication Data
US 2018/0106958 A1    Apr. 19, 2018

(30) Foreign Application Priority Data
May 6, 2016   (CN) .......................... 2016 1 0300198

(51) Int. Cl.
*G02F 1/1333*   (2006.01)
*F21V 8/00*     (2006.01)

(52) U.S. Cl.
CPC ........... *G02B 6/0088* (2013.01); *G02B 6/009* (2013.01); *G02B 6/0051* (2013.01);
(Continued)

(58) Field of Classification Search
CPC .. G02B 6/0088; G02B 6/0051; G02B 6/0053; G02B 6/0055; G02B 6/009
(Continued)

(56) References Cited

U.S. PATENT DOCUMENTS

| | | | | |
|---|---|---|---|---|
| 2001/0017673 A1* | 8/2001 | Lee | .................... | G02F 1/133308 349/58 |
| 2007/0046873 A1* | 3/2007 | Sakurai | ................. | G02F 1/1333 349/122 |
| 2014/0140092 A1* | 5/2014 | Kuan | ................... | G02B 6/0088 362/606 |

* cited by examiner

*Primary Examiner* — Lucy Chien
(74) *Attorney, Agent, or Firm* — Leong C. Lei (57) ABSTRACT

The present invention provides a mold-frame-free liquid crystal display device and an assembly method thereof, in which a lower surface of a liquid crystal display panel (2) is provided with a first double-sized adhesive tape (110) that circumferentially surrounds an effective display area (21) and an optical film assembly (15) is adhesively attached to the first double-sized adhesive tape (110) and a reflector plate (14) and a light guide plate (11) are sequentially disposed inside the terminal frame (4) and, finally, the liquid crystal display panel (2) that includes the optical film assembly (15) attached thereto and the terminal frame (4) with the reflector plate (14) and the light guide plate (11) disposed therein are assembled together, whereby a backlighting mold frame can be omitted, the cost can be reduced, and a bezel width of a liquid crystal display device can be effectively reduced to realize narrow bezel of the liquid crystal display device, increase product competition power, allow the backlight module to be assembled with the liquid crystal display panel and the terminal frame to increase the degree of integration of the liquid crystal display panel and improve accuracy of assembly.

10 Claims, 6 Drawing Sheets

(52) U.S. Cl.
CPC ......... *G02B 6/0053* (2013.01); *G02B 6/0055* (2013.01); *G02B 6/0091* (2013.01); *G02F 1/133308* (2013.01); *G02F 2001/133311* (2013.01); *G02F 2001/133325* (2013.01); *G02F 2201/50* (2013.01); *G02F 2202/28* (2013.01)

(58) Field of Classification Search
USPC .......................................................... 349/58
See application file for complete search history.

MOLD-FRAME-FREE LIQUID CRYSTAL DISPLAY DEVICE AND ASSEMBLY METHOD THEREOF

BACKGROUND OF THE INVENTION

1. Field of the Invention

The present invention relates to the field of liquid crystal display technology, and in particular to a mold-frame-free liquid crystal display device and assembly method thereof.

2. The Related Arts

Liquid crystal displays (LCDs) have a variety of advantages, such as thin device body, low power consumption, and being free of radiation, and thus have wide applications, such as liquid crystal televisions, mobile phones, personal digital assistants (PDAs), digital cameras, computer monitors, and notebook computer screens, so as to take a leading position in the field of flat panel displays.

Most of the LCDs that are currently available in the market are backlighting LCDs, which comprise a liquid crystal panel and a backlight module. The working principle of the liquid crystal panel is that a drive voltage is applied to a thin-film transistor (TFT) array substrate and a color filter (CF) substrate to control a rotation direction of the liquid crystal molecules located between the two substrates in order to refract out light emitting from the backlight module to generate an image.

Since the liquid crystal display panel itself does not emit light, light must be provided from the backlight module in order to normally display images. Thus, the backlight module is one of the key components of the liquid crystal display devices. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal panel. The side-edge backlight module comprises an LED light bar, which is arranged rearward of one side of the liquid crystal panel to serve as a backlighting source.

Figure 1:
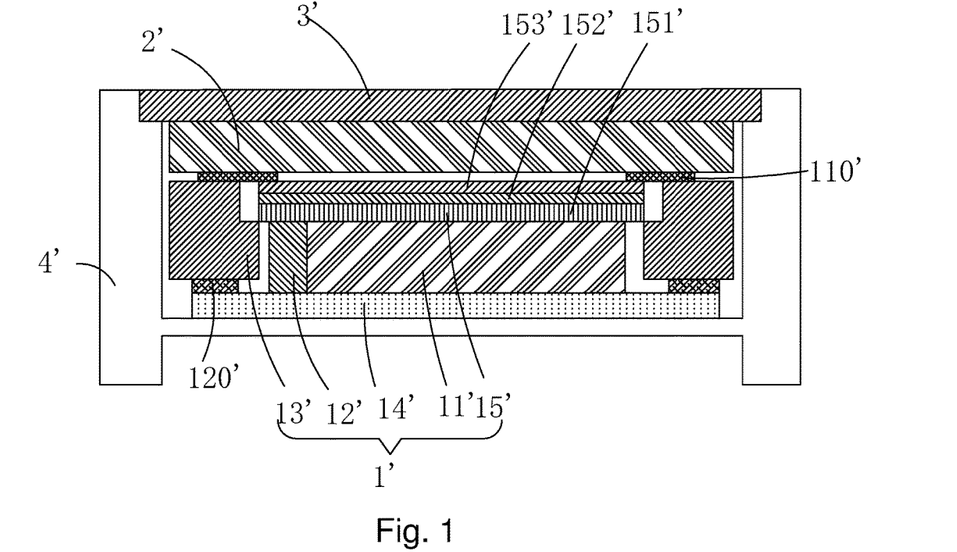
FIG. 1 is a schematic view illustrating the structure of a conventional liquid crystal display device.
Figure 2:
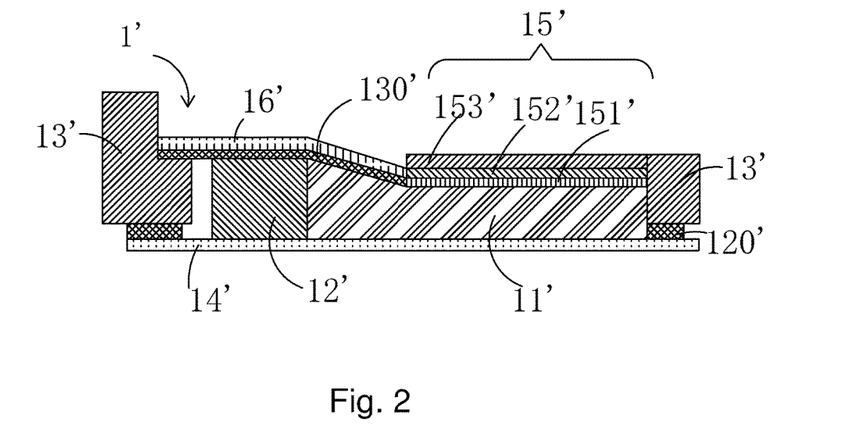
FIG. 2 is a schematic view illustrating a backlight module of the liquid crystal display device shown in FIG. 1.

Narrow bezel liquid crystal display devices, due to advantages of being simple, good-looking, and showing a relatively large view area for same size, are now the major trend of development for high quality display screens. Referring to FIG. 1, a schematic view is given to illustrate the structure of a conventional liquid crystal display device, which comprises: a backlight module 1', a first double-sized adhesive tape 110' disposed on an edge portion of an upper surface of the backlight module 1', a liquid crystal display panel 2' disposed on an upper surface of the first double-sized adhesive tape 11', a protection lid 3' disposed on an upper surface of the liquid crystal display panel 2', and a terminal frame 4' disposed on a lower surface of the protection lid 3' and enclosing the backlight module 1' and the liquid crystal display panel 2'. Referring to FIG. 2, a schematic view is given to illustrate the structure of the backlight module of the liquid crystal display device shown in FIG. 1, which comprises: a light guide plate 11', a backlight source 12' disposed at one side of the light guide plate 11', a mold frame 13' disposed at one side of the backlight source 12' that is distant from the light guide plate 11' and also disposed at one side of the light guide plate 11' that is distant from the backlight source 12', a second double-sided adhesive tape 120' disposed on a lower surface of the mold frame 13', a reflector plate 14' adhesively attached to an underside of the mold frame 13' by the second double-sided adhesive tape 120', a third double-sided adhesive tape 130' disposed on surfaces of the backlight source 12' and the mold frame 13', a backlight-source flexible circuit board 16' disposed on an upper surface of the third double-sided adhesive tape 130', and an optical film assembly 15' disposed on an upper surface of the light guide plate 11'. The optical film assembly 15' comprises, disposed from bottom to top, a diffuser plate 151', a lower prism 152' and an upper prism 153'.

To assemble the liquid crystal display device, the reflector plate 14' is first adhesively attached to the lower surface of the mold frame 13' and then, the light guide plate 11', the backlight source 12', the backlight-source flexible circuit board 14' and the optical film assembly 15' are assembled in the area surrounded by the mold frame 13' to complete the manufacture of the backlight module 1'. Afterwards, the first double-sized adhesive tape 110' is disposed on the upper surface of the backlight module 1' and is adhesively attached to the liquid crystal display panel 2'. Finally, the backlight module 1' and the liquid crystal display panel 2' so assembled is positioned into the terminal frame 4' and the protection lid 3' is set on the upper surface of the liquid crystal display panel 2'. Due to the existence of the mold frame 13' of the backlight module 1', a frame width of the backlight module 1' is increased so that a bezel width of the liquid crystal display device is expanded and thus product competition power is reduced.

SUMMARY OF THE INVENTION

An object of the present invention is to provide a mold-frame-free liquid crystal display device, which has high assembly accuracy and is capable of reducing bezel width of a liquid crystal display device, lowering down product cost, and improving product competition power.

Another object of the present invention is to provide an assembly method of a mold-frame-free liquid crystal display device, which has high assembly accuracy and is capable of reducing bezel width of a liquid crystal display device, lowering down product cost, increasing the degree of integration of a liquid crystal display panel, realizing narrow bezel of the liquid crystal display device, and improving product competition power.

To achieve the above objects, the present invention provides a mold-frame-free liquid crystal display device, which comprises: a terminal frame, a reflector plate arranged inside the terminal frame, a light guide plate arranged on the reflector plate, a backlight source disposed to correspond to one side of the light guide plate, a liquid crystal display panel arranged above the light guide plate, and an optical film assembly arranged between the light guide plate and the liquid crystal display panel;

the liquid crystal display panel comprising: an effective display area located on a central portion thereof and a peripheral area located on a circumference of the effective display area;

the liquid crystal display panel having a lower surface to which a first double-sized adhesive tape is adhesively attached to circumferentially surround the effective display area of the liquid crystal display panel, the optical film assembly being adhesively attached to the lower surface of the liquid crystal display panel by the first double-sized adhesive tape.

The optical film assembly comprises, stacked in sequence from top to bottom, an upper prism, a lower prism, and a diffuser plate.

The upper prism, the lower prism, and the diffuser plate respectively have sizes that are successively increased from a small value to a large value and the size of the upper prism is greater than the effective display area of the liquid crystal display panel and the size of the diffuser plate is less than or equal to a size of the lower surface of the liquid crystal display panel.

A light source retention slot is arranged at one side of the light guide plate located in the terminal frame and the backlight source is disposed in the light source retention slot.

The liquid crystal display panel has an upper surface that is covered with a protection lid.

The present invention also provides an assembly method of a mold-frame-free liquid crystal display device, which comprises the following steps:

(1) providing a terminal frame, a reflector plate, a second double-sided adhesive tape, and a light guide plate, adhesively attaching the second double-sided adhesive tape to an internal bottom surface of the terminal frame, using the second double-sided adhesive tape to adhesively bond the reflector plate to the terminal frame, and disposing the light guide plate on the reflector plate;

(2) providing a liquid crystal display panel and a first double-sized adhesive tape;

wherein the liquid crystal display panel comprises: an effective display area located on a central portion and a peripheral area located on an outer circumferential portion of the effective display area; and the first double-sized adhesive tape is adhesively attached to a lower surface of the liquid crystal display panel such that the first double-sized adhesive tape circumferentially surrounds the effective display area of the liquid crystal display panel;

(3) providing an optical film assembly and assembling together the optical film assembly, the liquid crystal display panel, and the terminal frame in which the reflector plate and the light guide plate are arranged;

wherein the optical film assembly is located between the light guide plate and the liquid crystal display panel and is adhesively attached to a lower surface of the liquid crystal display panel by the first double-sized adhesive tape.

The optical film assembly comprises, stacked in sequence from top to bottom, an upper prism, a lower prism, and a diffuser plate; and the upper prism, the lower prism, and the diffuser plate respectively have sizes that are successively increased from a small value to a large value and the size of the upper prism is greater than the effective display area of the liquid crystal display panel and the size of the diffuser plate is less than or equal to a size of the lower surface of the liquid crystal display panel.

Step (3) comprises:

(31) having the upper prism adhesively attached to the lower surface of the liquid crystal display panel by the first double-sized adhesive tape;

(32) stacking the diffuser plate and the lower prism in sequence, from bottom to top, on the light guide plate; and (33) having the liquid crystal display panel and the terminal frame mated and assembled together such that the lower surface of the liquid crystal display panel and an upper surface of the light guide plate are positioned against each other and the diffuser plate and the lower prism that are positioned on the light guide plate are adhesively attached to the lower surface of the liquid crystal display panel by the first double-sized adhesive tape.

Alternatively step (3) comprises:

(31) having the upper prism, the lower prism, and the diffuser plate sequentially, from top to bottom, and adhesively attached to the lower surface of the liquid crystal display panel by the first double-sized adhesive tape; and (32) having the liquid crystal display panel and the terminal frame mated and assembled together such that the lower surface of the liquid crystal display panel and an upper surface of the light guide plate are positioned against each other.

Step (1) further comprises a step of arranging a light source retention slot at one side of the light guide plate located in the terminal frame and disposing the backlight source in the light source retention slot; and step (3) further comprises a step of setting a protection lid to cover an upper surface of the liquid crystal display panel.

The present invention further provides mold-frame-free liquid crystal display device, which comprises: a terminal frame, a reflector plate arranged inside the terminal frame, a light guide plate arranged on the reflector plate, a backlight source disposed to correspond to one side of the light guide plate, a liquid crystal display panel arranged above the light guide plate, and an optical film assembly arranged between the light guide plate and the liquid crystal display panel;

the liquid crystal display panel comprising: an effective display area located on a central portion thereof and a peripheral area located on a circumference of the effective display area;

the liquid crystal display panel having a lower surface to which a first double-sized adhesive tape is adhesively attached to circumferentially surround the effective display area of the liquid crystal display panel, the optical film assembly being adhesively attached to the lower surface of the liquid crystal display panel by the first double-sized adhesive tape;

wherein the optical film assembly comprises, stacked in sequence from top to bottom, an upper prism, a lower prism, and a diffuser plate;

wherein a light source retention slot is arranged at one side of the light guide plate located in the terminal frame and the backlight source is disposed in the light source retention slot.

The efficacy of the present invention is that the present invention provides a mold-frame-free liquid crystal display device, in which a lower surface of a liquid crystal display panel is provided with a first double-sized adhesive tape that circumferentially surrounds an effective display area and an optical film assembly is adhesively attached to the first double-sized adhesive tape and a reflector plate and a light guide plate are sequentially disposed inside the terminal frame and, finally, the liquid crystal display panel that comprises the optical film assembly attached thereto and the terminal frame with the reflector plate and the light guide plate disposed therein are assembled together, whereby a backlighting mold frame can be omitted, the cost can be reduced, and a bezel width of a liquid crystal display device can be effectively reduced to realize narrow bezel of the liquid crystal display device, increase product competition power, allow the backlight module to be assembled with the liquid crystal display panel and the terminal frame to increase the degree of integration of the liquid crystal display panel and improve accuracy of assembly. The present invention provides an assembly method of a mold-frame-free liquid crystal display device, which helps lower down cost, reduces a bezel width of the liquid crystal display device, realizes a narrow bezel of the liquid crystal display device, increases product competition power, increases the degree of integration of a liquid crystal display panel, and improve accuracy of assembly.

BRIEF DESCRIPTION OF THE DRAWINGS

The features and technical contents of the present invention will be better understood by referring to the following detailed description and drawings the present invention. However, the drawings are provided for the purpose of reference and illustration and are not intended to limit the scope of the present invention. In the drawing.

DETAILED DESCRIPTION OF THE PREFERRED EMBODIMENTS

To further expound the technical solution adopted in the present invention and the advantages thereof, a detailed description is given to a preferred embodiment of the present invention with reference to the attached drawings.

Figure 3:
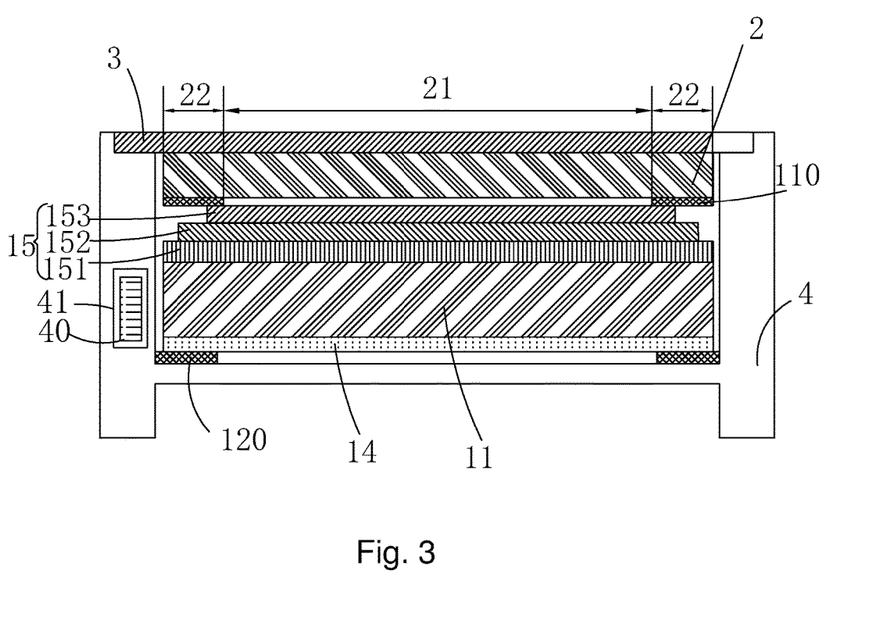
FIG. 3 is a schematic view illustrating the structure of a liquid crystal display device according to the present invention.

Referring to FIG. 3, a mold-frame-free liquid crystal display device according to the present invention comprises: a terminal frame 4, a reflector plate 14 arranged inside the terminal frame 4, a light guide plate 11 arranged on the reflector plate 14, a backlight source 40 disposed to correspond to one side of the light guide plate 11, a liquid crystal display panel 2 arranged above the light guide plate 11, and an optical film assembly 15 arranged between the light guide plate 11 and the liquid crystal display panel 2.

Particularly, the liquid crystal display panel 2 comprises: an effective display area 21 located on a central portion thereof and a peripheral area 22 located on a circumference of the effective display area 21.

The liquid crystal display panel 2 has a lower surface to which a first double-sized adhesive tape 110 is adhesively attached to circumferentially surround the effective display area 21 of the liquid crystal display panel 2. The optical film assembly 15 is adhesively attached to the lower surface of the liquid crystal display panel 2 by the first double-sized adhesive tape 110.

Specifically, the terminal frame 4 is formed of a material having relatively high hardness and a preferred material is a metal or a plastic material. The first double-sized adhesive tape 110 is a light-shielding double-sided adhesive tape.

Specifically, the optical module 15 comprises, stacked in sequence from top to bottom, an upper prism 153, a lower prism 152, and a diffuser plate 151.

It is noted that the upper prism 153, the lower prism 152, and the diffuser plate 151 respectively have sizes that are successively increased from a small value to a larger value and preferably, the upper prism 153, the lower prism 152, and the diffuser plate 151 are all rectangular in shape. The first double-sized adhesive tape 110 is in the form of a centrally-hollowed rectangular frame so that when the upper prism 153 is adhesively attached to the first double-sized adhesive tape 110, the first double-sized adhesive tape 110 still has a remaining portion to receive the lower prism 152 and the diffuser plate 151 to adhesively attach thereto. When the lower prism 152 is also adhesively attached to the first double-sized adhesive tape 110, the first double-sized adhesive tape 110 still has a remaining portion to receive the diffuser plate 151 to adhesively attach thereto. When the diffuser plate 151 is also adhesively attached to the first double-sized adhesive tape 110, the optical film assembly 15 that is composed of the upper prism 153, the lower prism 152, and the diffuser plate 151 is completed. The first double-sized adhesive tape 110 is disposed in the peripheral area 22 of the liquid crystal display panel 2, so that after completion of adhesive bonding of the upper prism 153, the lower prism 152, and the diffuser plate 151, positioning of the upper prism 153, the lower prism 152, and the diffuser plate 151 is also completed to thereby effectively improve assembly accuracy of the liquid crystal display device.

Further, a light source retention slot 41 is arranged at one side of the light guide plate 11 located in the terminal frame 4. The backlight source 40 is disposed in the light source retention slot 41 so as to further reduce a width of the terminal frame 4 and thus a width of a bezel of the liquid crystal display device. The liquid crystal display panel 2 has a side that is distant from the terminal frame 4 and is covered with a protection lid 3.

It is noted that since the mold-frame-free liquid crystal display device uses the terminal frame 4 to position and fix the backlight source 40, the light guide plate 11, and the reflector plate 14 and uses the first double-sized adhesive tape 110 that is disposed in the peripheral area 22 of the liquid crystal display panel 2 to position and fix the optical film assembly 15, there is no need to provide a mold frame structure that is conventionally used for positioning and fixing at one side of the terminal frame 4 so that a process and cost for manufacturing a mold frame can be omitted thereby effectively reducing a width of the terminal frame and thus reducing a width of a bezel of the liquid crystal display device to realize a narrow bezel of the liquid crystal display device and increase product competition power.

Figure 4:
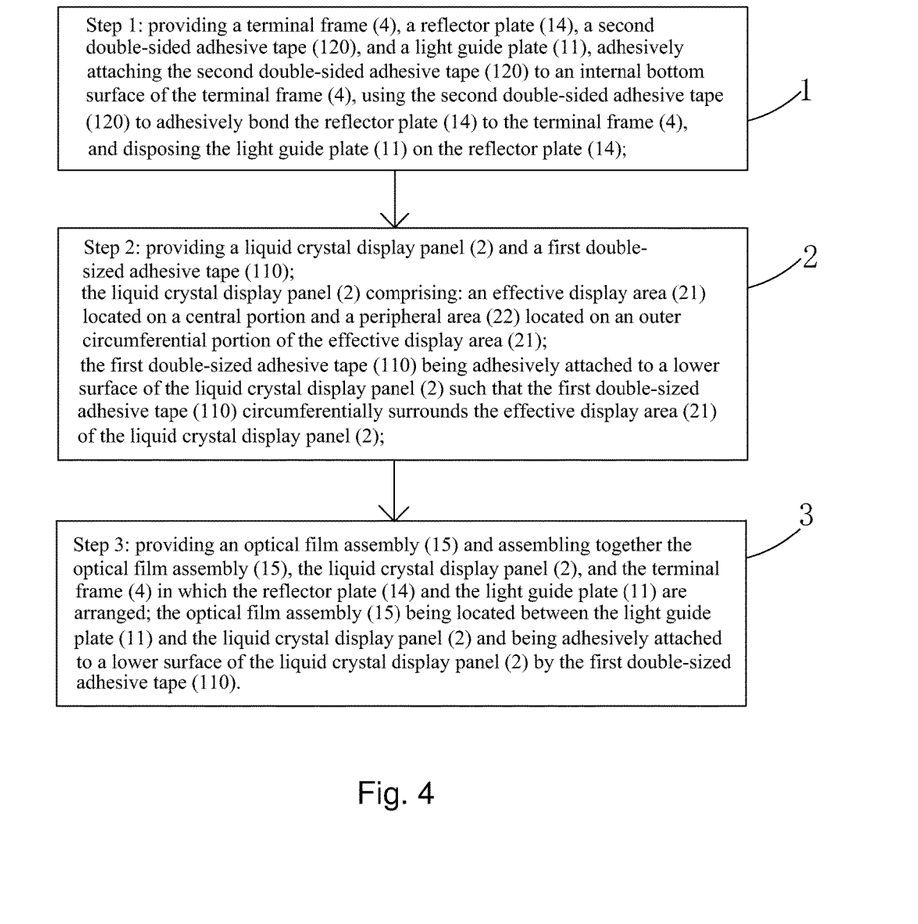
FIG. 4 is flow chart illustrating an assembly method of a liquid crystal display device according to the present invention.

Referring to FIG. 4, the present invention also provides an assembly method of a mold-frame-free liquid crystal display device, which comprises the following steps:

Step 1: providing a terminal frame 4, a reflector plate 14, a second double-sided adhesive tape 120, and a light guide plate 11, adhesively attaching the second double-sided adhesive tape 120 to an internal bottom surface of the terminal frame 4, using the second double-sided adhesive tape 120 to adhesively bond the reflector plate 14 to the terminal frame 4, and disposing the light guide plate 11 on the reflector plate 14.

Specifically, Step 4 further comprises a step of arranging a light source retention slot 41 at one side of the light guide plate 11 located in the terminal frame 4 to receive the backlight source 40 to be disposed therein. The second double-sided adhesive tape 120 is a piece of adhesive tape in the form of a centrally-hollowed rectangular frame. The terminal frame 4 is formed of a material having relatively high hardness and a preferred material is a metal or a plastic material.

Step 2: providing a liquid crystal display panel 2 and a first double-sized adhesive tape 110.

The liquid crystal display panel 2 comprises: an effective display area 21 located on a central portion and a peripheral area 22 located on an outer circumferential portion of the effective display area 21.

The first double-sized adhesive tape 110 is adhesively attached to a lower surface of the liquid crystal display panel 2 such that the first double-sized adhesive tape 110 circumferentially surrounds the effective display area 21 of the liquid crystal display panel 2.

Specifically, the first double-sized adhesive tape 110 is a light-shielding double-sided adhesive tape. In Step 2, positioning is achieved with the effective display area 21, where the first double-sized adhesive tape 110 is adhesively attached to the peripheral area 22 of the liquid crystal display panel 2 to ensure accuracy of attaching and thus improve the performance of assembly.

Step 3: providing an optical film assembly 15 and assembling together the optical film assembly 15, the liquid crystal display panel 2, and the terminal frame 4 in which the reflector plate 14 and the light guide plate 11 are arranged.

The optical film assembly 15 is located between the light guide plate 11 and the liquid crystal display panel 2 and is adhesively attached to a lower surface of the liquid crystal display panel 2 by the first double-sized adhesive tape 110.

Specifically, the optical module 15 comprises, stacked in sequence from top to bottom, an upper prism 153, a lower prism 152, and a diffuser plate 151.

It is noted that the upper prism 153, the lower prism 152, and the diffuser plate 151 respectively have sizes that are successively increased from a small value to a large value and preferably, the upper prism 153, the lower prism 152, and the diffuser plate 151 are all rectangular in shape. The first double-sized adhesive tape 110 is in the form of a centrally-hollowed rectangular frame so that when the upper prism 153 is adhesively attached to the first double-sized adhesive tape 110, the first double-sized adhesive tape 110 still has a remaining portion to receive the lower prism 152 and the diffuser plate 151 to adhesively attach thereto. When the lower prism 152 is also adhesively attached to the first double-sized adhesive tape 110, the first double-sized adhesive tape 110 still has a remaining portion to receive the diffuser plate 151 to adhesively attach thereto. When the diffuser plate 151 is also adhesively attached to the first double-sized adhesive tape 110, the optical film assembly 15 that is composed of the upper prism 153, the lower prism 152, and the diffuser plate 151 is completed. The first double-sized adhesive tape 110 is disposed in the peripheral area 22 of the liquid crystal display panel 2, so that after completion of adhesive bonding of the upper prism 153, the lower prism 152, and the diffuser plate 151, positioning of the upper prism 153, the lower prism 152, and the diffuser plate 151 is also completed to thereby effectively improve assembly accuracy of the liquid crystal display device.

Figure 5:
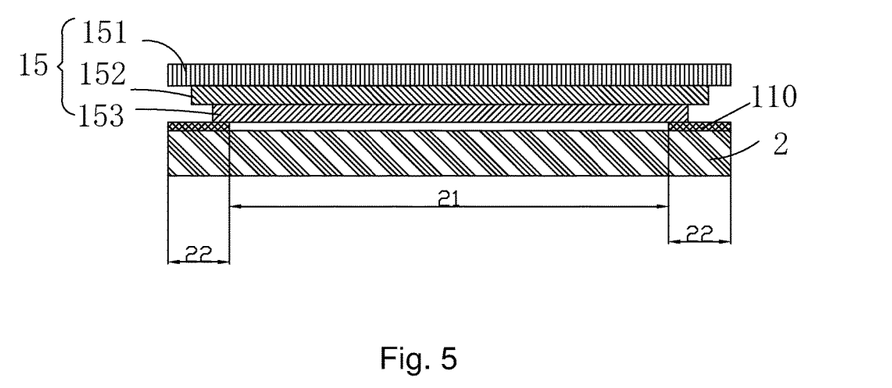
FIGS. 5 and 6 are schematic views demonstrating step 3 of a first example of the assembly method of the liquid crystal display device according to the present invention.
Figure 6:
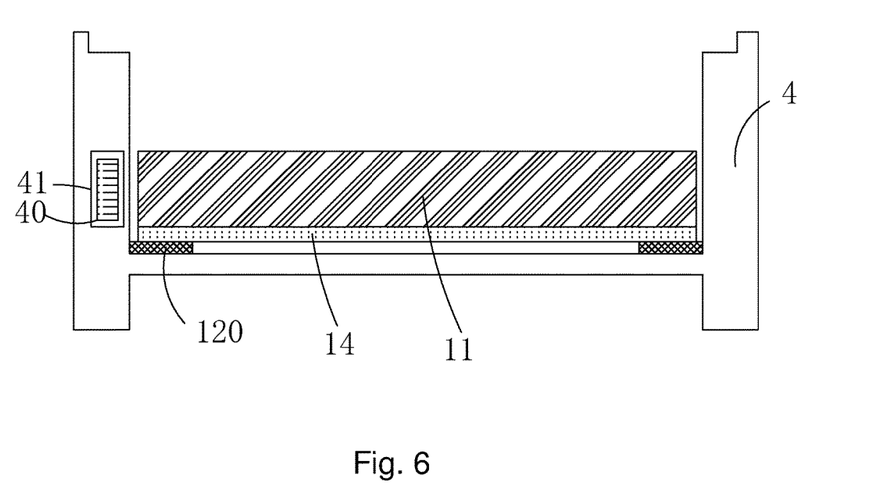

Optionally, referring to FIGS. 5 and 6, in a first example of the assembly method of a mold-frame-free liquid crystal display device according to the present invention, Step 3 specifically comprises:

Step 31: having the upper prism 153, the lower prism 152, and the diffuser plate 151 sequentially, from top to bottom, and adhesively attached to the lower surface of the liquid crystal display panel 2 by the first double-sized adhesive tape 110; and Step 32: having the liquid crystal display panel 2 and the terminal frame 4 mated and assembled together such that the lower surface of the liquid crystal display panel 2 and an upper surface of the light guide plate 11 are positioned against each other.

Figure 7:
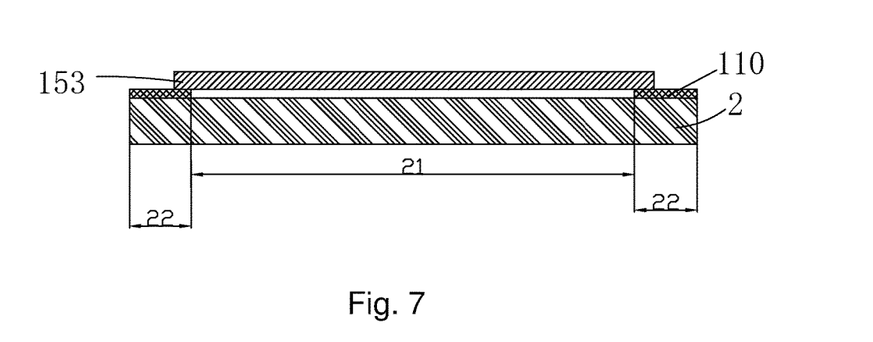
FIGS. 7 and 8 are schematic views demonstrating step 3 of a second example of the assembly method of the liquid crystal display device according to the present invention.
Figure 8:
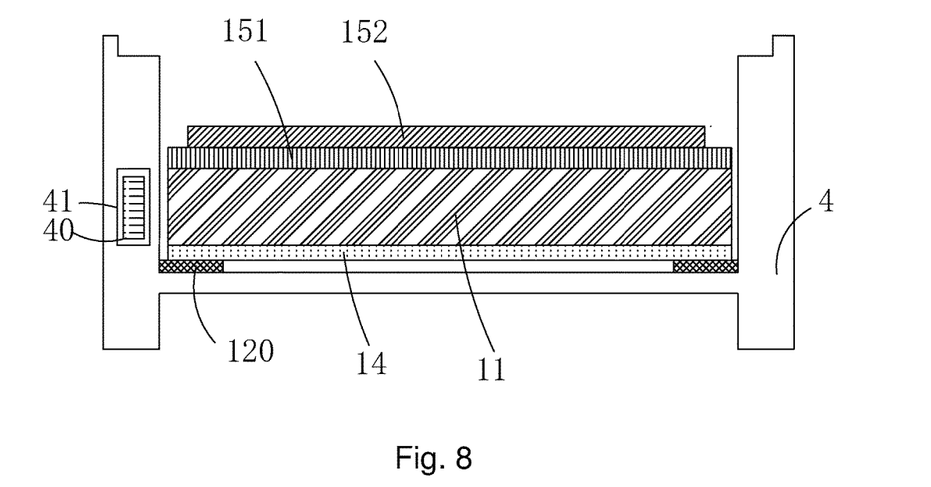

Optionally, referring to FIGS. 7 and 8, in a second example of the assembly method of a mold-frame-free liquid crystal display device according to the present invention, Step 3 specifically comprises:

Step 31: having the upper prism 153 adhesively attached to the lower surface of the liquid crystal display panel 2 by the first double-sized adhesive tape 110;

Step 32: stacking the diffuser plate 151 and the lower prism 152 in sequence, from bottom to top, on the light guide plate 11; and Step 33: having the liquid crystal display panel 2 and the terminal frame 4 mated and assembled together such that the lower surface of the liquid crystal display panel 2 and an upper surface of the light guide plate 11 are positioned against each other and the diffuser plate 151 and the lower prism 152 that are positioned on the light guide plate 11 are adhesively attached to the lower surface of the liquid crystal display panel 2 by the first double-sized adhesive tape 110.

Figure 9:
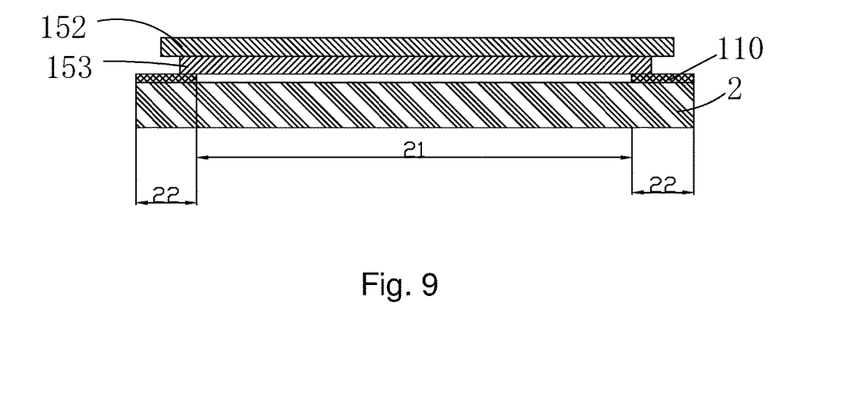
FIGS. 9 and 10 are schematic views demonstrating step 3 of a first example of the assembly method of the liquid crystal display device according to the present invention.
Figure 10:
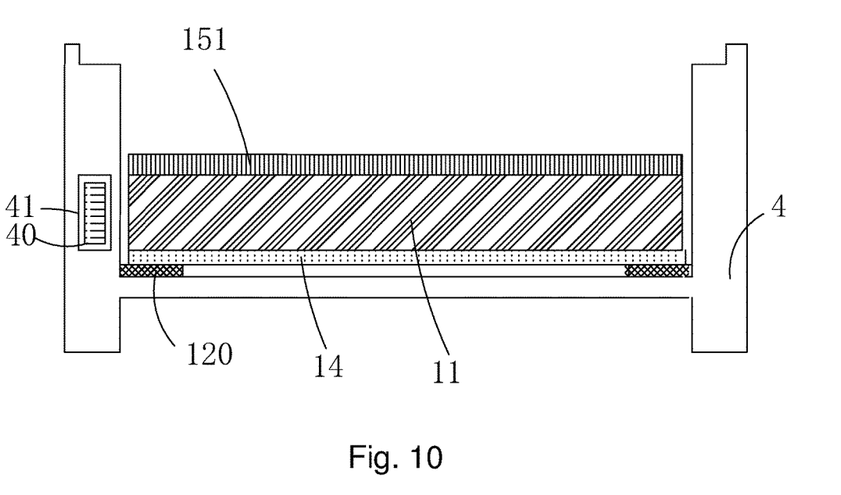

Optionally, referring to FIGS. 9 and 10, in a third example of the assembly method of a mold-frame-free liquid crystal display device according to the present invention, Step 3 specifically comprises:

Step 31: having the upper prism 153 and the lower prism 152 sequentially, from top to bottom, and adhesively attached to the lower surface of the liquid crystal display panel 2 by the first double-sized adhesive tape 110;

Step 32: positioning the diffuser plate 151 on the light guide plate 11; and Step 33: having the liquid crystal display panel 2 and the terminal frame 4 mated and assembled together such that the lower surface of the liquid crystal display panel 2 and an upper surface of the light guide plate 11 are positioned against each other and the diffuser plate 151 that is positioned on the light guide plate 11 is adhesively attached to the lower surface of the liquid crystal display panel 2 by the first double-sized adhesive tape 110.

It is noted that since the mold-frame-free liquid crystal display device uses the terminal frame 4 to position and fix the backlight source 40, the light guide plate 11, and the reflector plate 14 and uses the first double-sized adhesive tape 110 that is disposed in the peripheral area 22 of the liquid crystal display panel 2 to position and fix the optical film assembly 15, there is no need to provide a mold frame structure that is conventionally used for positioning and fixing at one side of the terminal frame 4 so that a process and cost for manufacturing a mold frame can be omitted thereby effectively reducing a width of the terminal frame and thus reducing a width of a bezel of the liquid crystal display device to realize a narrow bezel of the liquid crystal display device and increase product competition power.

In summary, the present invention provides a mold-frame-free liquid crystal display device, in which a lower surface of a liquid crystal display panel is provided with a first double-sized adhesive tape that circumferentially surrounds an effective display area and an optical film assembly is adhesively attached to the first double-sized adhesive tape and a reflector plate and a light guide plate are sequentially disposed inside the terminal frame and, finally, the liquid crystal display panel that comprises the optical film assembly attached thereto and the terminal frame with the reflector plate and the light guide plate disposed therein are assembled together, whereby a backlighting mold frame can be omitted, the cost can be reduced, and a bezel width of a liquid crystal display device can be effectively reduced to realize narrow bezel of the liquid crystal display device, increase product competition power, allow the backlight module to be assembled with the liquid crystal display panel and the terminal frame to increase the degree of integration of the liquid crystal display panel and improve accuracy of assembly. The present invention provides an assembly method of a mold-frame-free liquid crystal display device, which helps lower down cost, reduces a bezel width of the liquid crystal display device, realizes a narrow bezel of the liquid crystal display device, increases product competition power, increases the degree of integration of a liquid crystal display panel, and improve accuracy of assembly.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A mold-frame-free liquid crystal display device, comprising: a terminal frame, a reflector plate arranged inside the terminal frame, a light guide plate arranged on the reflector plate, a backlight source disposed to correspond to one side of the light guide plate, a liquid crystal display panel arranged above the light guide plate, and an optical film assembly arranged between the light guide plate and the liquid crystal display panel;
    the liquid crystal display panel comprising: an effective display area located on a central portion thereof and a peripheral area located on a circumference of the effective display area;
    the liquid crystal display panel having a lower surface to which a first double-sized adhesive tape is adhesively attached to circumferentially surround the effective display area of the liquid crystal display panel, the optical film assembly being adhesively attached to the lower surface of the liquid crystal display panel by the first double-sized adhesive tape;
    wherein the optical film assembly comprises, stacked in sequence from top to bottom, an upper prism, a lower prism, and a diffuser plate; and
    wherein the upper prism, the lower prism, and the diffuser plate respectively have sizes that are successively increased from a small value to a large value and the size of the upper prism is greater than the effective display area of the liquid crystal display panel and the size of the diffuser plate is less than or equal to a size of the lower surface of the liquid crystal display panel.

2. The mold-frame-free liquid crystal display device as claimed in claim 1, wherein a light source retention slot is arranged at one side of the light guide plate located in the terminal frame and the backlight source is disposed in the light source retention slot.

3. The mold-frame-free liquid crystal display device as claimed in claim 1, wherein the liquid crystal display panel has an upper surface that is covered with a protection lid.

4. An assembly method of a mold-frame-free liquid crystal display device, comprising the following steps:
    (1) providing a terminal frame, a reflector plate, a second double-sided adhesive tape, and a light guide plate, adhesively attaching the second double-sided adhesive tape to an internal bottom surface of the terminal frame, using the second double-sided adhesive tape to adhesively bond the reflector plate to the terminal frame, and disposing the light guide plate on the reflector plate;
    (2) providing a liquid crystal display panel and a first double-sized adhesive tape;
    wherein the liquid crystal display panel comprises: an effective display area located on a central portion and a peripheral area located on an outer circumferential portion of the effective display area; and
    the first double-sized adhesive tape is adhesively attached to a lower surface of the liquid crystal display panel such that the first double-sized adhesive tape circumferentially surrounds the effective display area of the liquid crystal display panel;
    (3) providing an optical film assembly and assembling together the optical film assembly, the liquid crystal display panel, and the terminal frame in which the reflector plate and the light guide plate are arranged;
    wherein the optical film assembly is located between the light guide plate and the liquid crystal display panel and is adhesively attached to a lower surface of the liquid crystal display panel by the first double-sized adhesive tape; and
    wherein the optical film assembly comprises, stacked in sequence from top to bottom, an upper prism, a lower prism, and a diffuser plate; and
    the upper prism, the lower prism, and the diffuser plate respectively have sizes that are successively increased from a small value to a large value and the size of the upper prism is greater than the effective display area of the liquid crystal display panel and the size of the diffuser plate is less than or equal to a size of the lower surface of the liquid crystal display panel.

5. The assembly method of the mold-frame-free liquid crystal display device as claimed in claim 4, wherein
    step (1) further comprises a step of arranging a light source retention slot at one side of the light guide plate located in the terminal frame and disposing the backlight source in the light source retention slot; and
    step (3) further comprises a step of setting a protection lid to cover an upper surface of the liquid crystal display panel.

6. The assembly method of the mold-frame-free liquid crystal display device as claimed in claim 5, wherein step (3) comprises:
    (31) having the upper prism adhesively attached to the lower surface of the liquid crystal display panel by the first double-sized adhesive tape;
    (32) stacking the diffuser plate and the lower prism in sequence, from bottom to top, on the light guide plate; and
    (33) having the liquid crystal display panel and the terminal frame mated and assembled together such that the lower surface of the liquid crystal display panel and an upper surface of the light guide plate are positioned against each other and the diffuser plate and the lower prism that are positioned on the light guide plate are adhesively attached to the lower surface of the liquid crystal display panel by the first double-sized adhesive tape.

7. The assembly method of the mold-frame-free liquid crystal display device as claimed in claim 5, wherein step (3) comprises:
    (31) having the upper prism, the lower prism, and the diffuser plate sequentially, from top to bottom, and adhesively attached to the lower surface of the liquid crystal display panel by the first double-sized adhesive tape; and (32) having the liquid crystal display panel and the terminal frame mated and assembled together such that the lower surface of the liquid crystal display panel and an upper surface of the light guide plate are positioned against each other.

8. The assembly method of the mold-frame-free liquid crystal display device as claimed in claim 5, wherein step (3) comprises:

(31) having the upper prism and the lower prism sequentially, from top to bottom, and adhesively attached to the lower surface of the liquid crystal display panel by the first double-sized adhesive tape;

(32) positioning the diffuser plate on the light guide plate; and (33) having the liquid crystal display panel and the terminal frame mated and assembled together such that the lower surface of the liquid crystal display panel and an upper surface of the light guide plate are positioned against each other and the diffuser plate that is positioned on the light guide plate is adhesively attached to the lower surface of the liquid crystal display panel by the first double-sized adhesive tape.

9. A mold-frame-free liquid crystal display device, comprising: a terminal frame, a reflector plate arranged inside the terminal frame, a light guide plate arranged on the reflector plate, a backlight source disposed to correspond to one side of the light guide plate, a liquid crystal display panel arranged above the light guide plate, and an optical film assembly arranged between the light guide plate and the liquid crystal display panel;

the liquid crystal display panel comprising: an effective display area located on a central portion thereof and a peripheral area located on a circumference of the effective display area;

the liquid crystal display panel having a lower surface to which a first double-sized adhesive tape is adhesively attached to circumferentially surround the effective display area of the liquid crystal display panel, the optical film assembly being adhesively attached to the lower surface of the liquid crystal display panel by the first double-sized adhesive tape;

wherein the optical film assembly comprises, stacked in sequence from top to bottom, an upper prism, a lower prism, and a diffuser plate;

wherein a light source retention slot is arranged at one side of the light guide plate located in the terminal frame and the backlight source is disposed in the light source retention slot;

wherein the upper prism, the lower prism, and the diffuser plate respectively have sizes that are successively increased from a small value to a large value and the size of the upper prism is greater than the effective display area of the liquid crystal display panel and the size of the diffuser plate is less than or equal to a size of the lower surface of the liquid crystal display panel.

10. The mold-frame-free liquid crystal display device as claimed in claim 9, wherein the liquid crystal display panel has an upper surface that is covered with a protection lid.

* * * * *